US012335717B2

(12) United States Patent
Jang et al.

(10) Patent No.: US 12,335,717 B2
(45) Date of Patent: Jun. 17, 2025

(54) METHOD AND APPARATUS FOR SPATIAL AUDIO REPRODUCTION USING DIRECTIONAL ROOM IMPULSE RESPONSES INTERPOLATION

(71) Applicant: Electronics and Telecommunications Research Institute, Daejeon (KR)

(72) Inventors: Dae Young Jang, Daejeon (KR); Jiahong Zhao, Wollongong (AU); Xiguang Zheng, Wollongong (AU); Christian Ritz, Wollongong (AU)

(73) Assignee: Electronics and Telecommunications Research Institute, Daejeon (KR)

( * ) Notice: Subject to any disclaimer, the term of this patent is extended or adjusted under 35 U.S.C. 154(b) by 335 days.

(21) Appl. No.: 18/108,494

(22) Filed: Feb. 10, 2023

(65) Prior Publication Data

US 2023/0362572 A1 Nov. 9, 2023

(30) Foreign Application Priority Data

Feb. 10, 2022 (KR) ........................ 10-2022-0017540
Feb. 8, 2023 (KR) ........................ 10-2023-0017051

(51) Int. Cl.
*H04S 7/00* (2006.01)
*H04R 5/027* (2006.01)

(52) U.S. Cl.
CPC ............. *H04S 7/303* (2013.01); *H04R 5/027* (2013.01); *H04S 7/305* (2013.01); *H04S 2400/11* (2013.01); *H04S 2400/15* (2013.01); *H04S 2420/11* (2013.01)

(58) Field of Classification Search
CPC ...... H04S 7/303; H04S 7/305; H04S 2400/15; H04R 5/027
USPC ............................................ 381/303, 300, 1
See application file for complete search history.

(56) References Cited

U.S. PATENT DOCUMENTS

| | | | | |
|---|---|---|---|---|
| 10,602,298 B2 * | 3/2020 | Raghuvanshi | .......... | H04S 3/008 |
| 11,877,143 B2 * | 1/2024 | Raghuvanshi | .......... | H04S 7/305 |
| 2019/0356999 A1 | 11/2019 | Raghuvanshi et al. | | |
| 2021/0029487 A1 | 1/2021 | Muynke et al. | | |

FOREIGN PATENT DOCUMENTS

WO 2021237265 A1 12/2021

OTHER PUBLICATIONS

Kaspar Müller, et al., Auralization based on multi-perspective ambisonic room impulse responses, Published by EDP Sciences, 2020, Acta Acustica, https://doi.org/10.1051/aacus/2020024.
Antonello, Niccolò et al., Room impulse response interpolation using a sparse spatio-temporal representation of the sound field, IEEE Press, pp. 1-13, vol. 25, No. 10, Oct. 2017.

* cited by examiner

*Primary Examiner* — Thjuan K Addy
(74) *Attorney, Agent, or Firm* — WILLIAM PARK & ASSOCIATES LTD.

(57) ABSTRACT

Disclosed are a method for spatial audio reproduction based on D-RIRs includes: selecting measurement points around a listener based on the location of the listener; calculating a D-RIR for the location of the listener based on D-RIRs for the measurement points around the listener; and reproducing spatial audio at the location of the listener based on the D-RIR at the location of the listener.

20 Claims, 8 Drawing Sheets

METHOD AND APPARATUS FOR SPATIAL AUDIO REPRODUCTION USING DIRECTIONAL ROOM IMPULSE RESPONSES INTERPOLATION

CROSS-REFERENCE TO RELATED APPLICATION

This application claims under 35 U.S.C. § 119(a) the benefit of Korean Patent Application Nos. 10-2022-0017540 and 10-2023-0017051 filed on Feb. 10, 2022, and Feb. 8, 2023, respectively, which are incorporated herein by reference.

TECHNICAL FIELD

The present invention relates to a method of generating a three-dimensional (3D) room impulse response at a desired listener location to faithfully reproduce six degrees of freedom (6DoF) spatial audio in the field of interactive, immersive media such as virtual reality and augmented reality, and more particularly to a method and apparatus for generating a room impulse response at a desired location through the interpolation of multiple directional room impulse responses.

BACKGROUND ART

The contents described in this section merely provide information about the background art of the present invention and do not constitute prior art.

Recently, in the field of immersive media, there has been a growing interest in increasing the degree of freedom of movement of a user to provide more immersive virtual reality in line with the advancement of virtual reality equipment. This improvement in the degree of freedom not only provides the convenience of movement for a user, but also allows the user to feel a sense of unity with a space by using dynamic spatial recognition ability beyond the static representation of a simple 3D effect, thereby also providing the effect of providing an improved sense of immersion. As for sound technology, three degrees of freedom (3DoF) 3D audio technology, which provides spatial synchronization with virtual reality video images by reflecting head rotation based on head tracking, is mainly used. Meanwhile, in 6DoF sound technology including MPEG-I, which is currently being internationally standardized, the development of spatial sound technology is underway to apply changes in reflection and reverberation attributable to changes in the structure of space and the transmission path of sound in real time by reflecting even a user's free movement.

SUMMARY OF THE DISCLOSURE

An object of the present invention is to propose a method and apparatus for spatial audio reproduction that, in technology for encoding and reproducing 6DoF spatial audio for virtual reality or augmented reality, represent audio information, distributed inside an arbitrary space, using multiple D-RIRs and generate reflection and reverberation at any location based on a user's movement by interpolating multiple D-RIRs.

An object of the present invention is to propose a spatial audio encoding and rendering technique using D-RIR interpolation in which a D-RIR calculation process is performed within an authoring or encoding process so that spatial audio can be reproduced by a relatively simple interpolation operation in a spatial audio rendering step.

An object of the present invention is to propose a spatial audio encoding and rendering technique based on D-RIR interpolation that is capable of efficiently reproducing spatial audio corresponding to the current location of a moving user.

An object of the present invention is to propose a spatial audio encoding and rendering technique based on D-RIR interpolation that is capable of effectively reproducing spatial audio even when a sound source moves.

An object of the present invention is to propose a configuration that utilizes the direction information of reflection to reflect spatial features in the interpolation of multiple D-RIRs and calculates an RIR corresponding to the location of a moving user.

According to an aspect of the present invention, there is provided a method for spatial audio reproduction based on D-RIRs that is performed by a processor that executes one or more instructions stored in memory. The method for spatial audio reproduction includes: step S440 of selecting measurement points around a listener based on the location of the listener; step S450 of calculating a D-RIR for the location of the listener based on D-RIRs for the measurement points around the listener; and step S460 of reproducing spatial audio at the location of the listener based on the D-RIR at the location of the listener.

In step S450 of calculating the D-RIR for the location of the listener, the D-RIR for the location of the listener may be calculated by interpolating the D-RIRs for the plurality of measurement points around the listener for the location of the listener.

Step S450 of calculating the D-RIR for the location of the listener may include the steps of: extracting the attenuation level, delay, and direction of arrival of reflection from each of the multiple D-RIRs previously measured for the plurality of measurement points around the listener; and calculating the D-RIR for the location of the listener by interpolating the D-RIR information, extracted from the multiple D-RIRs previously measured for the plurality of measurement points around the listener, for the location of the listener.

Step S450 of calculating the D-RIR for the location of the listener may include the steps of: obtaining D-RIRs arriving at the measurement points around the listener from at least one sound source; interpolating the D-RIRs, arriving at the measurement points around the listener from the at least one sound source, for the location of the listener; and obtaining a D-RIR arriving at the location of the listener from the at least one sound source based on the results of the interpolation.

The D-RIRs for the plurality of measurement points around the listener may be signals obtained using ambisonic microphones. The step of obtaining the D-RIRs arriving at the measurement points around the listener from the at least one sound source may include the step of detecting the intervals of reflection components based on modeling using ambisonic microphones and calculating the directions of arrival of the reflections.

Step S450 of calculating the D-RIR for the location of the listener may include the steps of: obtaining D-RIRs arriving at the measurement points around the listener from the at least one first sound source; performing first interpolation on the D-RIRs, arriving at the measurement points around the listener from the at least one first sound source, for the location of a new second sound source; performing second interpolation on D-RIRs, arriving at the measurement points around the listener from the second sound source obtained as a result of the first interpolation, for the location of the listener; and obtaining a D-RIR, arriving at the location of the listener from the second sound source, based on the results of the second interpolation.

In step S440 of selecting the measurement points around the listener based on the location of the listener, two or more measurement points around the listener may be selected from among a plurality of virtual listener measurement points each having a D-RIR arriving from at least one sound source based on the relative locations of the plurality of virtual listener measurement points and the location of the listener.

In step S440 of selecting the measurement points around the listener based on the location of the listener, the measurement points around the listener may be selected from among a plurality of virtual listener measurement points that are distributed in a given space in a virtual reality environment having 6DoF and each of the plurality of virtual listener measurement points have a D-RIR.

In step S450 of calculating the D-RIR for the location of the listener, the D-RIR for the location of the listener may be calculated using the D-RIRs previously obtained for the measurement points around the listener in a given space in a virtual reality environment having 6DoF.

According to an aspect the present invention, there is provided a method for spatial audio encoding based on D-RIRs that is performed by a processor that executes one or more instructions stored in memory. The method for spatial audio encoding includes: step S410 of selecting virtual listener locations as measurement points based on spatial information and at least one sound source location; and step S420 of obtaining D-RIRs for the virtual listener locations from the at least one sound source. In this case, the D-RIRs for the virtual listener locations from the at least one sound source may include responses to sound arriving directly at the virtual listener locations from the at least one sound source, and responses to sound reflected within a given space and arriving at the virtual listener locations, based on information about the given space in a 6DoF virtual reality environment.

According to an aspect the present invention, there is provided an apparatus for spatial audio reproduction based on D-RIRs according to an embodiment of the present invention includes: memory configured to store at least one instruction; and a processor configured to execute the at least one instruction. The processor executes at least one instruction to select measurement points around a listener based on the location of the listener, to calculate a D-RIR for the location of the listener based on D-RIRs for the measurement points around the listener, and to reproduce spatial audio at the location of the listener based on the D-RIR for the location of the listener.

The processor may execute the at least one instruction to calculate the D-RIR for the location of the listener by interpolating the D-RIRs for the plurality of measurement points around the listener for the location of the listener.

The processor may execute the at least one instruction to extract the attenuation level, delay, direction of arrival a reflection from each of the multiple D-RIRs previously measured for the plurality of measurement points around the listener, and to calculate the D-RIR for the location of the listener by interpolating the D-RIR information, extracted from the multiple D-RIRs previously measured for the plurality of measurement points around the listener, for the location of the listener.

The processor may execute the at least one instruction to obtain D-RIRs arriving at the measurement points around the listener from at least one sound source, to interpolate the D-RIRs, arriving at the measurement points around the listener from the at least one sound source, for the location of the listener, and to obtain a D-RIR arriving at the location of the listener from the at least one sound source based on the results of the interpolation.

The D-RIRs for the plurality of measurement points around the listener may be signals obtained using ambisonic microphones. The processor may execute the at least one instruction to obtain the D-RIRs arriving at the measurement points around the listener from the at least one sound source by detecting the intervals of reflection components based on using ambisonic microphones and calculating the modeling directions of arrival of the reflections.

The processor may execute the at least one instruction to obtain D-RIRs arriving at the measurement points around the listener from the at least one first sound source, to perform first interpolation on the D-RIRs, arriving at the measurement points around the listener from the at least one first sound source, for the location of a new second sound source, to perform second interpolation on D-RIRs, arriving at the measurement points around the listener from the second sound source obtained as a result of the first interpolation, for the location of the listener, and to obtain a D-RIR, arriving at the location of the listener from the second sound source, based on the results of the second interpolation.

The processor may execute the at least one instruction to select two or more measurement points around the listener from among a plurality of virtual listener measurement points each having a D-RIR arriving from at least one sound source based on the relative locations of the plurality of virtual listener measurement points and the location of the listener.

The processor may execute the at least one instruction to select the measurement points around the listener from among a plurality of virtual listener measurement points that are distributed in a given space in a virtual reality environment having 6DoF and each of the plurality of virtual listener measurement points have a D-RIR.

The processor may execute the at least one instruction to calculate the D-RIR for the location of the listener using the D-RIRs previously obtained for the measurement points around the listener in a given space in a virtual reality environment having 6DoF.

The processor may execute the at least one instruction to select virtual listener locations as measurement points based on spatial information and at least one sound source location, and to obtain D-RIRs for the virtual listener locations from the at least one sound source. In this case, the D-RIRs for the virtual listener locations from the at least one sound source may include responses to sound arriving directly at the virtual listener locations from the at least one sound source and responses to sound reflected within a given space and arriving at the virtual listener locations, based on information about the given space in a 6DoF virtual reality environment.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Figure 1:
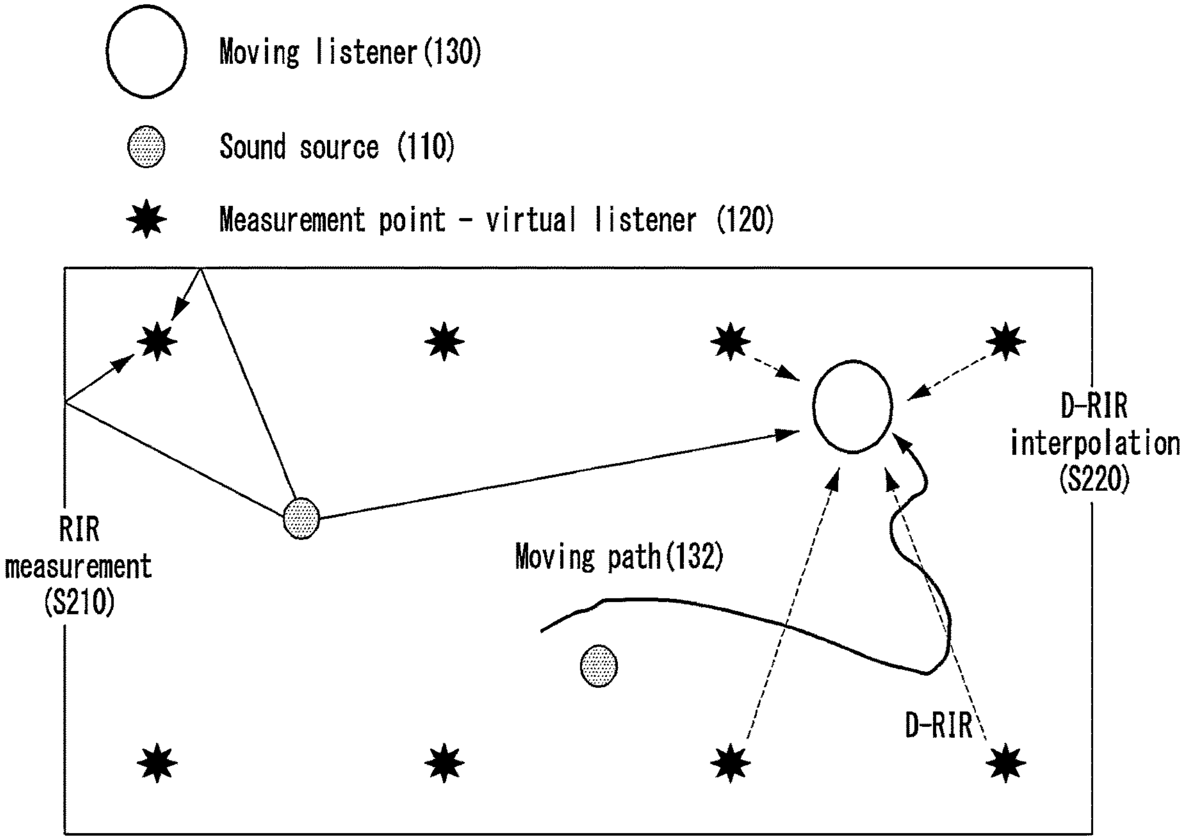
FIG. 1 is a conceptual diagram showing the basic concept and scenario of a spatial audio encoding and reproducing process according to an embodiment of the present invention.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a component further is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Meanwhile, even if a technology is known prior to the filing date of the present disclosure, it may be included as part of the configuration of the present disclosure when necessary, and will be described herein without obscuring the spirit of the present disclosure. However, in describing the configuration of the present disclosure, a detailed description on matters that can be clearly understood by those skilled in the art as a known technology prior to the filing date of the present disclosure may obscure the purpose of the present disclosure, so excessively detailed description on the known technology will be omitted.

For example, known technologies prior to the filing of this application may be used as a technology for expressing and restoring sound using an ambisonic model and a technology for expressing and restoring sound using D-RIRs. At least some of these known technologies may be applied as elemental technologies necessary for practicing the present invention.

However, the purpose of the present invention is not to claim the rights to these known technologies, and the contents of the known technologies may be included as part of the present invention within the range that does not depart from the spirit of the present invention.

Hereinafter, preferred embodiments of the present invention will be described in more detail with reference to the accompanying drawings. In order to facilitate an overall understanding in the description of the present invention, the same reference numerals will be assigned to the same components throughout the drawings, and redundant descriptions of the same components will be omitted.

FIG. 1 is a conceptual diagram showing the basic concept and scenario of a spatial audio encoding and reproducing process according to an embodiment of the present invention.

Recently, in the field of immersive media, there is a growing interest in increasing the degree of freedom of a user's movement in order to provide a more immersive virtual reality experience according to the advancement of virtual reality equipment.

It is known that when the degree of freedom of a user's movement can be increased, the user's movement in a virtual space can be reflected in real time, the dynamic factor of audio-visual object recognition can be used in a 3D space, senses of realism and presence in the space can be improved, and an improved sense of immersion can be provided.

In virtual reality sound technology, 3DoF 3D sound technology, which provides spatial synchronization with images of virtual reality images by reflecting the rotation of the head based on head tracking, is currently widely used in virtual reality content services. In contrast, in a 6DoF environment, senses of realism and immersion can be improved by applying spatial audio technology that reflects changes in location-based acoustic parameters such as reflection and reverberation due to a change in the location of a user according to the user's free movement.

Spatial audio generates particular reflection and reverberation according to the location in space as a radiated sound source propagates in all directions. These reflection and reverberation generate RIRs along with direct sound transmitted through a straight path between the sound source and a listener. In particular, the type of RIRs that surround a listener by imparting directionality to reflection are called D-RIRs. D-RIRs can be measured through a microphone array. Of such microphone arrays, microphones equally distributed on a spherical surface are called ambisonic microphones. Signals measured by ambisonic microphones can be converted into ambisonic signals of an arbitrary order by spherical harmonics decomposition. More specifically, ambisonics having four components W, X, Y, and Z is called first order ambisonics (FOA), and ambisonics having (n+1)^2 components that are more than those of first order ambisonics is called n-th order ambisonics. N-th order ambisonics are collectively called higher order ambisonics (HOA).

When an arbitrary space is given and the locations of a sound source and a listener are determined, a D-RIR at the location of the listener can be measured according to the radiation of sound waves, and immersive spatial audio can be provided to the listener by convolving the D-RIR and the sound source. Since the D-RIR can be considered to include features associated with the structure and material of space due to its characteristics, it can provide senses of realism and immersion to the listener. However, the process of calculating a D-RIR at the arbitrary location of a listener is a significantly complex process. Assuming a moving sound source and listener, the complexity increases further, which is an obstacle to the real-time rendering of spatial audio.

The present invention is intended to propose a spatial audio encoding and rendering/playback/reproduction technique capable of performing a D-RIR calculation process in an authoring or encoding step and performing a relatively simple interpolation operation in a spatial audio rendering step.

In order to overcome the above problem, in the authoring or encoding step, multiple D-RIRs at various locations determined in the space including a listener need to be calculated, and the information needs to be transmitted. Furthermore, in the spatial audio rendering step, two or more D-RIRs including a D-RIR at the location of the listener need to be selected from among the transmitted multiple D-RIRs, and the D-RIR at the location of the listener needs to be calculated from them. In this manner, a change in D-RIR can be generated even by the small movement of the listener, and the listener can maintain the quality of spatial audio similar to reality by recognizing the features of sound associated with the structure and material of the space. In this case, strategies for the calculation of multiple D-RIRs and the transmission of related information can be established by taking into consideration the movement of the sound source and the movement of the listener.

First, in order to provide the 6DoF movement of a listener, it is necessary to determine a plurality of virtual listener locations distributed in a given space, i.e., the locations where D-RIRs will be measured. Basically, although evenly distributed locations are ideal, it is necessary to reduce the number of D-RIRs for transmission efficiency. The locations where a change in the D-RIR is relatively small, i.e., a sound source, the corners of the space, the locations where obstacles are placed, and/or the locations that are away from a location open to the outside, may be excluded. When this function is included in the authoring step, they may be distributed to desired locations based on an author's intention. In contrast, when the function is included in the encoding step, it may be implemented as an algorithm according to the various reduction strategies, described above, based on uniform distribution.

The multiple D-RIRs measured as above may be composed of signals of channels determined according to the ambisonic order. For example, FOA consists of four channels: W, X, Y, and Z. In this case, the X, Y, and Z channels represent X-, Y-, and Z-axis components of 3D coordinates, and the W channel represents a non-directional component. After separating a reflection component, elevation and azimuth direction information can be derived using the level ratio of the X, Y, and Z channel signals. When the direction information is transmitted together with the W channel signal, a terminal can restore the X, Y, and Z channel signals.

D-RIR interpolation may be designed to first select two or more virtual listener locations including a listener location, to allocate a weight based on a relative distance attributable to the listener location using the direction information, time information, and level information of a reflection component included in multiple D-RIRs, and then to perform interpolation.

An encoder needs to calculate D-RIRs for each sound source at a plurality of virtual listener locations determined in a target space. When the sound source is a moving object, D-RIRs need to be calculated again according to the movement of the sound source. When the movement of the sound source is determined in advance in an authoring step, there is no problem because a D-RIR can be calculated again for the time of each transmission frame. For a sound source that is not determined in an authoring step, a D-RIR is calculated and then rendering is performed in a renderer, a D-RIR for the nearest sound source selected from D-RIRs among the that have already been transmitted is used, or a method for interpolation using D-RIRs for a multiple sound sources may be employed when there are the multiple sound sources around the sound source. Meanwhile, for a sound source whose location and movement have been determined in an authoring step and which is triggered by user interaction, it may be initially transmitted and stored, and may then be applied by user interaction.

Referring back to FIG. 1, in step S210, a virtual listener location 120 may be determined to be a measurement point according to various criteria within an arbitrary space, and a D-RIR between a sound source 110 and the virtual listener location 120 may be calculated by spatial audio modeling such as a wave equation, an image method, a ray tracing method, and/or the like. In step S220, a combination of two or more virtual listener locations 120 surrounding a moving real listener location 130 may also be determined for rendering for a 6DoF listener, and a D-RIR at the listener location 130 may be calculated by interpolation to which a weight proportional to the distance of the combination to the listener location 130 is applied. The D-RIR may be repeatedly calculated according to the moving path 132 of the listener in step S220. The listener may experience realistic and immersive spatial audio including the features of the space through the D-RIR at the current location calculated by interpolation.

Figure 2:
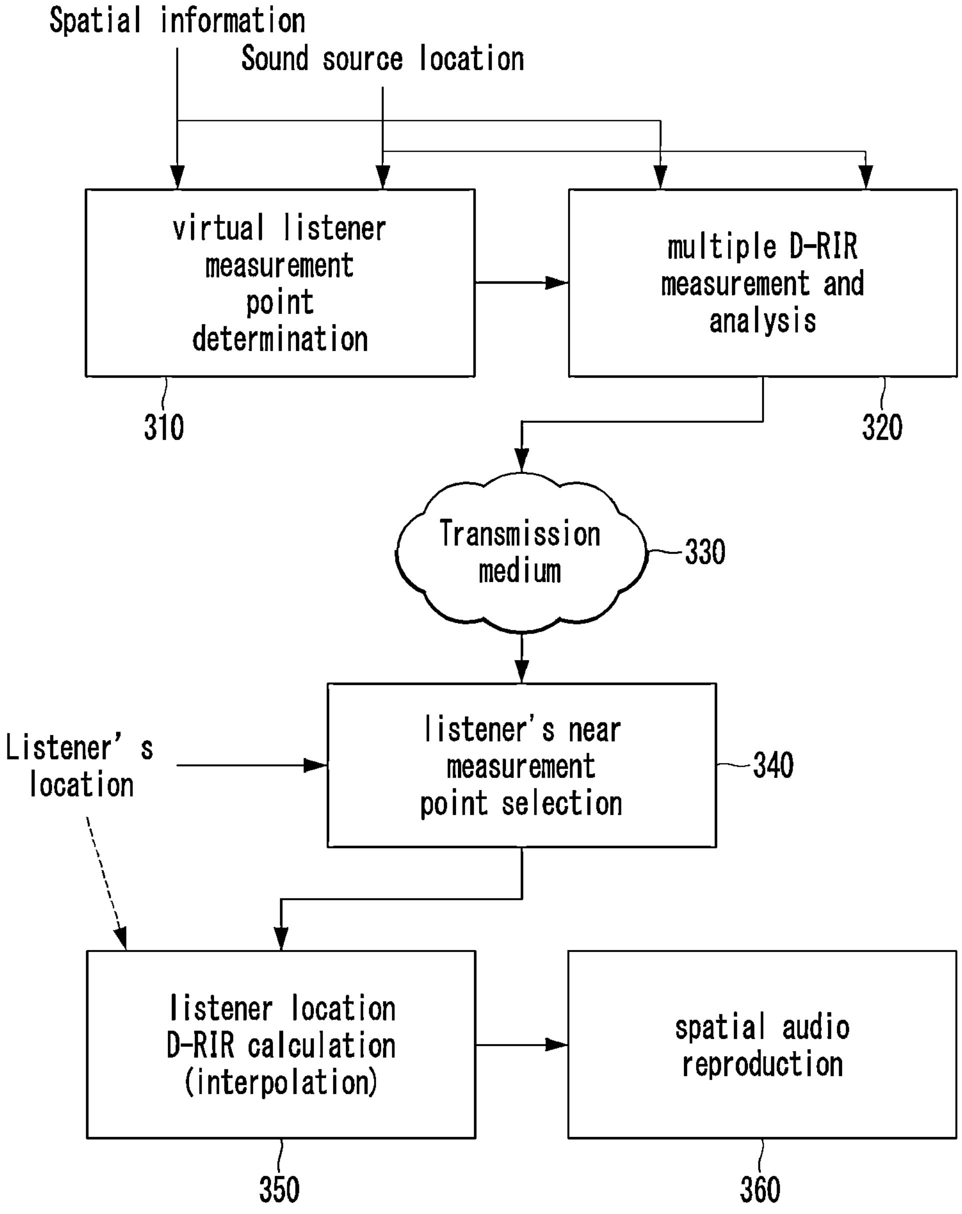
FIG. 2 is a conceptual diagram showing the structure of an apparatus for spatial audio encoding and reproduction and a multiple D-RIR interpolation process according to an embodiment of the present invention.

FIG. 2 is a conceptual diagram showing the structure of an apparatus for spatial audio encoding and reproduction and a multiple D-RIR interpolation process according an embodiment of the present invention.

Referring to FIG. 2, the apparatus for encoding and reproduction/playback/rendering for reproducing 6DoF spatial audio through multiple D-RIR interpolation may be implemented to include a virtual listener measurement point determination unit 310, a multiple D-RIR measurement and analysis unit 320, a transmission medium 330, a listener's near measurement point selection unit 340, a listener location D-RIR calculation unit 350, and a spatial audio reproduction unit 360.

The virtual listener measurement point determination unit 310 may determine an arbitrary number of measurement points in a space where a listener can move based on the structure of a given space and the location information of a sound source. In this case, the number and locations of measurement points may be determined by an author in an authoring step, may be determined to be measurement points having a uniform distribution within the space, or may be determined to be a reduced number of measurement points obtained by excluding portions having a small change in the D-RIR from the locations of measurement points having a uniform distribution. The number of measurement points may be determined according to the required spatial resolution of a target application field and the available transmission rate of the transmission medium.

The multiple D-RIR measurement and analysis unit 320 may measure a directional impulse response attributable to the structure of a space for each sound source and each measurement point, and may calculate the direction of arrival of reflection.

When there is a real space, direct measurement may be performed by an ambisonic microphone array in the real space. When there is no real space but there is only a virtual space, a reflection component and a reverberation component may be calculated by a spatial audio model and/or simulation (including the analysis of simulation results). Spatial audio modeling may utilize conventional spatial audio modeling methods such as a method using a wave equation, a method using ray tracing, and a method using an image source. The multiple D-RIR signals thus measured or obtained are subjected to the separation of a reflection component and the detection of a direction of arrival (DOA) by a method represented by Equations 3 to 7 to be described later, and information about the reverberation component may be parameterized and transmitted to a remote listener.

In this case, when the direct reflection component and the direction of arrival (DOA) are calculated according to the spatial audio model used, they can be transmitted without change. In the case of the reverberation component (or the diffusion component), information may be transmitted such that the terminal generates artificial reverberation by transmitting the reverberation time (e.g., RT60) of a given space. In addition, the delay time of the reflection attributable to a transmission path, the sound absorption of a wall material, and the attenuation rate attributable to propagation in the air may be parameterized and then transmitted.

The transmission medium 330 may include a communication medium or a storage medium capable of transmitting the parameters of the reflection component and the reverberation component generated by the multiple D-RIR measurement and analysis unit 320, i.e., the interval of the reflection, information about the direction of arrival of the reflection, the delay time of the reflection, information about the attenuation level, duration of the reverberation component (e.g., RT60), envelope information, etc.

The listener's near measurement point selection unit 340 may select measurement points forming a polygon or polyhedron and including a current listener location given in real time from among all the measurement points (the virtual listener locations) where D-RIRs are measured.

Figure 4:
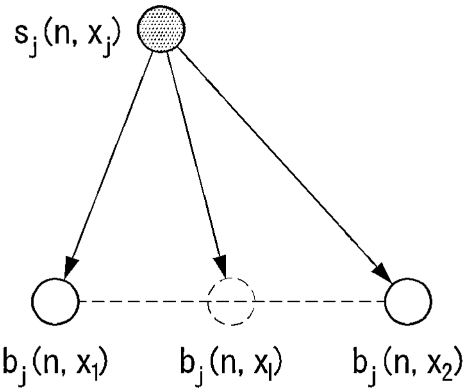
FIG. 4 is a conceptual diagram showing a D-RIR interpolation process for a current listener location using D-RIRs at two virtual listener locations.
Figure 5:
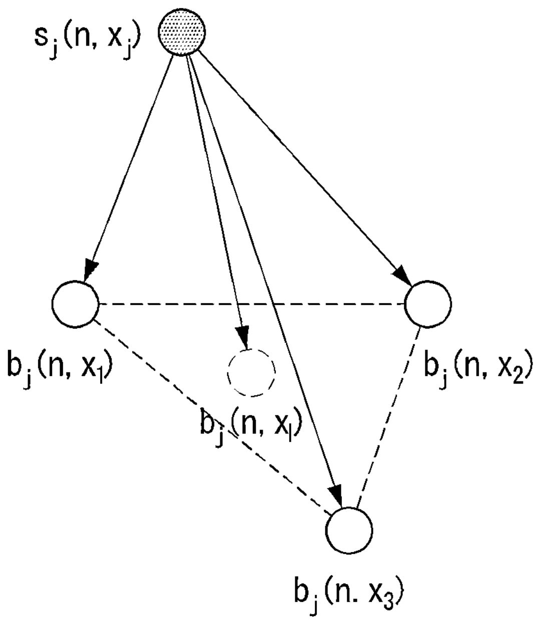
FIG. 5 is a conceptual diagram showing a D-RIR interpolation process for a current listener location using D-RIRs at three virtual listener locations.
Figure 6:
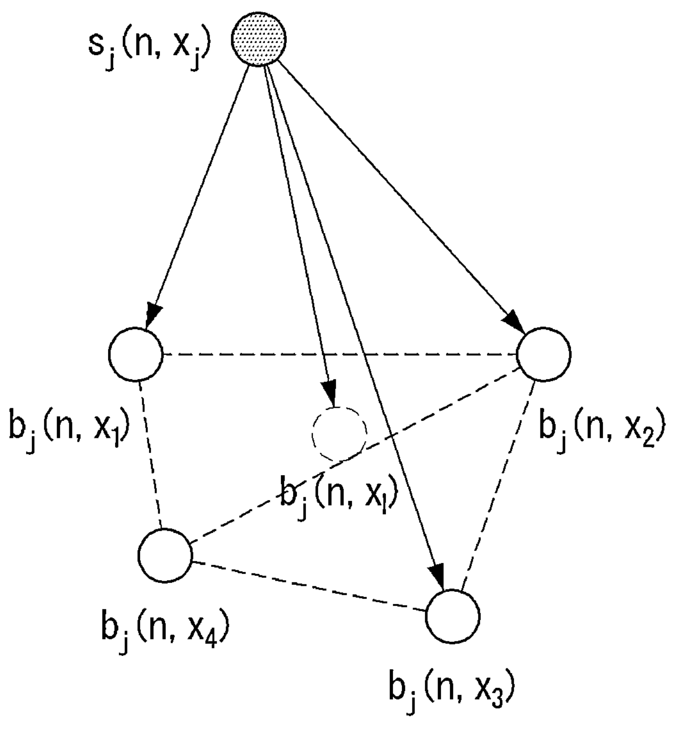
FIG. 6 is a conceptual diagram showing a D-RIR interpolation process for a current listener location using D-RIRs at four virtual listener locations.

An example of a process in which the listener's near measurement point selection unit 340 selects some of a plurality of measurement points around a current listener location is shown in FIGS. 4 to 6 below.

Figure 3:
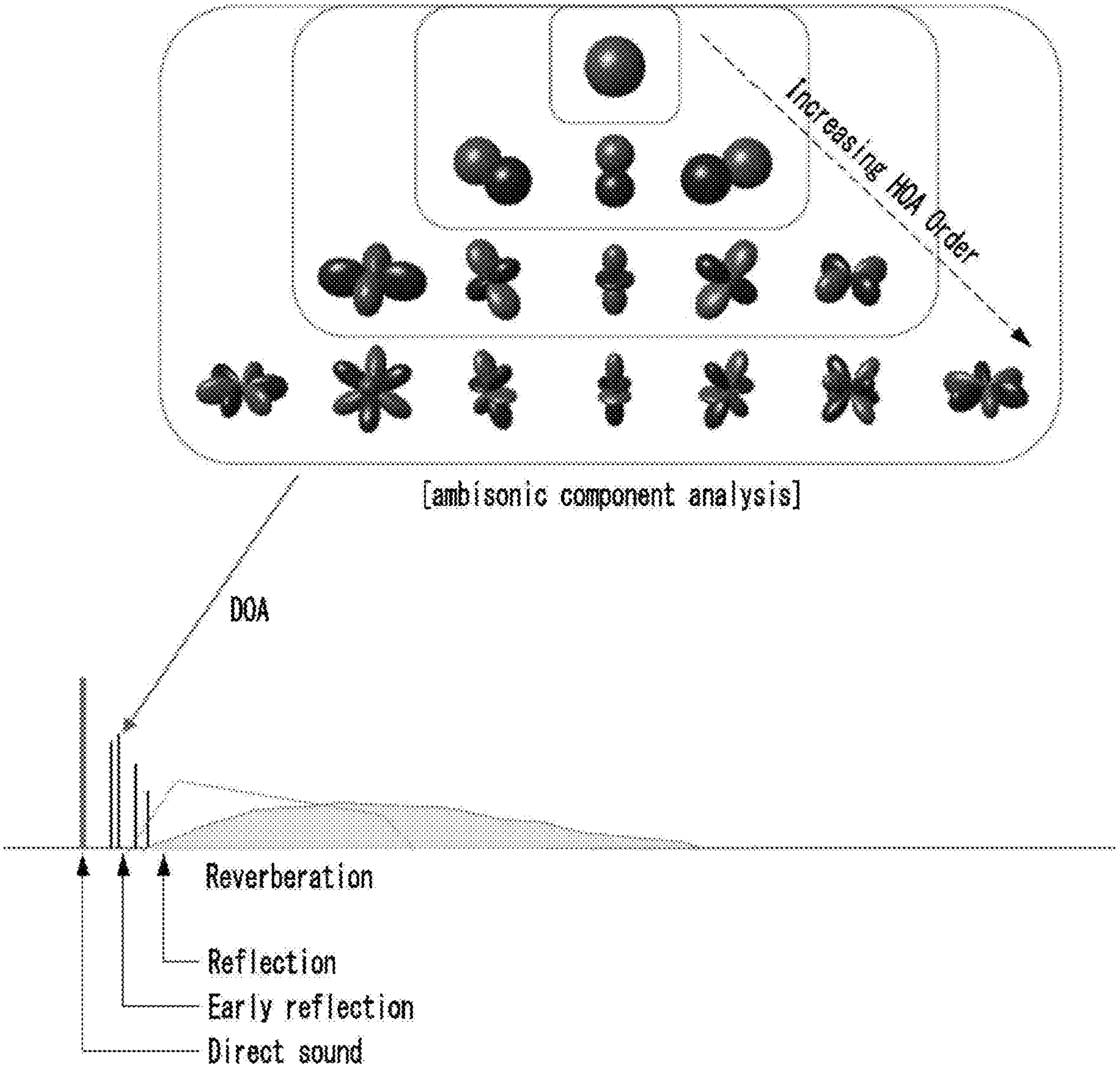
FIG. 3 is a conceptual diagram showing the relationship between components of ambisonic signals and a D-RIR used in an apparatus for spatial audio encoding and reproduction according to an embodiment of the present invention.

FIG. 3 is a conceptual diagram showing the relationship between components of ambisonic signals and a D-RIR used in an apparatus for spatial audio encoding and reproduction according to an embodiment of the present invention.

Referring to FIG. 3, a D-RIR has the form of an impulse response composed of reflection and diffused reverberation containing direction and level information by spatial audio modeling, and may be converted into and represented by an ambisonic signal or a multi-channel audio signal for convenience of mixing and rendering. When converted into a multi-channel audio signal, the D-RIR may be converted by a panning method for a channel pair including the direction of a sound source. In the case of being converted into an FOA signal, it may be calculated by Equation 1 below. In this case, S is the level of reflection, u is an elevation angle, and n is an azimuth angle. X, Y, and Z denote X-, Y-, and Z-axis components of 3D coordinates, and W denotes a non-direction component.

$$W = \frac{\sqrt{2}}{2} \cdot S$$

$$X = \cos\mu \cdot \cos\eta \cdot S \quad Y = \sin\mu \cdot \cos\eta \cdot S \quad Z = \sin\eta \cdot S \tag{1}$$

FIG. 4 is a conceptual diagram showing a D-RIR interpolation process for a current listener location using D-RIRs at two virtual listener locations.

FIG. 4 shows the concept of calculating a D-RIR at a real listener location $b_j(n,x_1)$ between two virtual listener locations $b_j(n,x_1)$ and $b_j(n,x_2)$ on a one-dimensional straight line at time n through interpolation for convenience of description.

FIG. 5 is a conceptual diagram showing a D-RIR interpolation process for a current listener location using D-RIRs at three virtual listener locations.

FIG. 5 shows the concept of calculating a D-RIR at a real listener location $b_j(n,x_1)$ among three virtual listener locations $b_j(n,x_1)$, $b_j(n,x_2)$, and $b_j(n,x_3)$ on a two-dimensional (2D) plane through interpolation.

FIG. 6 is a conceptual diagram showing a D-RIR interpolation process for a current listener location using D-RIRs at four virtual listener locations.

FIG. 6 shows a process of calculating a D-RIR at a real listener location $b_j(n,x_1)$ inside four virtual listener locations $b_j(n,x_1)$, $b_j(n,x_2)$, $b_j(n,x_3)$, and $b_j(n,x_4)$ in a 3D space through interpolation.

In a manner common to the embodiments of FIGS. 1 to 6, sound lines reaching a virtual listener may each have an independent direction of arrival (DOA), a delay, and an attenuation level according to a distance from a sound source (or a reflection image sound source) S. In a space having a significantly simple structure such as a rectangular parallelepiped, when early reflections reflect off the same wall and are incident onto respective virtual listener locations, changes in direction and delay time maintain linearity, so that error is small even when linear interpolation is performed. In contrast, as a spatial structure becomes more complex or the order of reflection increases, error attributable to interpolation may increase.

In order to reduce the error, a setting may be made such that a method of applying interpolation is used only when the difference in the delay time and the direction of arrival between the reflections incident at respective virtual listener locations falls within a predetermined range.

The D-RIR interpolation may be performed on each of the incident direction, delay time, and level of each reflection. The interpolation may be performed by allocating a weight that is inversely proportional to the distance between a virtual listener location and a current listener location, as in Equation 2 below.

In this case, $B_j$ denotes the incident direction, delay time, and level value of an FOA signal itself or each reflection measured by a j-th sound source, n is time, $x_i$ is the location of a listener, $x_m$ is the location of a virtual listener, and Wm denotes an interpolation weight according to the distance between the virtual listener and the real listener and may be normalized such that the sum of M Wm is 1.

$$B_j(n, x_l) = \sum_{m=1}^{M} w_m B_j(n, x_m) \tag{2}$$

where $B_j(n,x_m)=(X_j(n,x_m), Y_j(n,x_m), Z_j(n,x_m), W_j(n,x_m))$

In the embodiments of the present invention, the D-RIR may be a set of reflections generated by spatial audio modeling in a given virtual space, or may be an FOA signal directly measured in a real space. In the latter case, it is necessary to separate a specular reflection signal interval from an FOA signal and analyze it in order to calculate the incident direction, delay time, and level information of early reflections and perform interpolation in an apparatus for rendering/playback/reproduction.

An embodiment of a method of separating a specular reflection signal interval is to find a local peak by analyzing an FOA signal (a W channel signal) and determine the specular reflection signal interval to be values around the local peak based on an energy threshold value. This approach is frequently used in signal processing that finds and separates phoneme intervals in speech signals. To do this, first, a DC component that can affect the energy value needs to be eliminated (e.g., using a 20 Hz low-pass filter). The detection of a local peak and the detection of a specular reflection signal interval are performed by a fast tracker and a slow tracker, respectively, using a Hanning window. As an embodiment, a reflection component may be found in the manner shown in Equation 3 below:

$$p_w^{fast}(t)=P_w(t)*H_{fast}\ p_w^{slow}(t)=P_w(t)*H_{slow} \tag{3}$$

where $P_w(t)=W(t)\cdot W(t)$, $$H_{fast} = \frac{\text{hanning}(\tau_{fast}\cdot fs+1)}{\sum_{hanning}(\tau_{fast}\cdot fs+1)},\ H_{slow} = \frac{\text{hanning}(\tau_{slow}\cdot fs+1)}{\sum_{hanning}(\tau_{slow}\cdot fs+1)}$$

where $\tau_{fast}$=0.0003, and $\tau_{slow}$=0.002

$P_w(t)$ is the power of the W channel signal W(t) of the D-RIR signal, $H_{fast}$ is a filter corresponding to a fast tracker that derives average short-term power, and $H_{slow}$ is a filter corresponding to a slow tracker that derives average long-term power.

Hanning/hanning( ) refers to a Hanning window that takes the average over a given time interval. $\tau_{fast}$ may refer to a time interval corresponding to a fast tracker, and $\tau_{slow}$ may refer to a time interval corresponding to a slow tracker.

$P_w^{fast}(t)$ may refer to the power of the W channel signal that has passed through the fast tracker, and $P_w^{slow}(t)$ may refer to the power of the W channel signal that has passed through the slow tracker.

The real specular reflection signal interval may be calculated by calculating the energy ratio between the fast tracker and the slow tracker. As shown in Equation 4 below, the energy ratio $R_{dB}(t)$ of a specular reflection signal interval including time t is calculated, and a result is regarded as the specular reflection signal interval when the result satisfies the following three cases:

(a) a case where $R_{dB}(t)$ is larger than predefined threshold 1 (e.g., 6 dB)

(b) a case where $R_{dB}(t)$ is a local peak (c) a case where $P_w(t)$ is larger than predefined threshold 2 (e.g., −50 dB)

$$R_{dB}(t) = 10*\log_{10}\frac{P_w^{fast}(t)}{P_w^{slow}(t)} \tag{4}$$

As a result of the above, an i-th specular reflection signal interval $W_{reflect}^i$ may be determined to be the interval between start time $t_{start}^i$ and end time $t_{end}^i$ centered on local peak time $t_{R_{dB\_peak}}^i$, as shown in Equation 5. The interval $W_{diffuse}$ obtained by excluding the overall specular reflection signal internal from the overall interval W of a W channel signal may be considered to be diffusion and reverberation components.

$$W_{reflect}^i=W(t_{R_{dBpeak}}^i-t_{start}^i:t_{R_{dBpeak}}^i+t_{end}^i)\ W_{diffuse}=W-W_{reflect} \tag{5}$$

Figure 7:
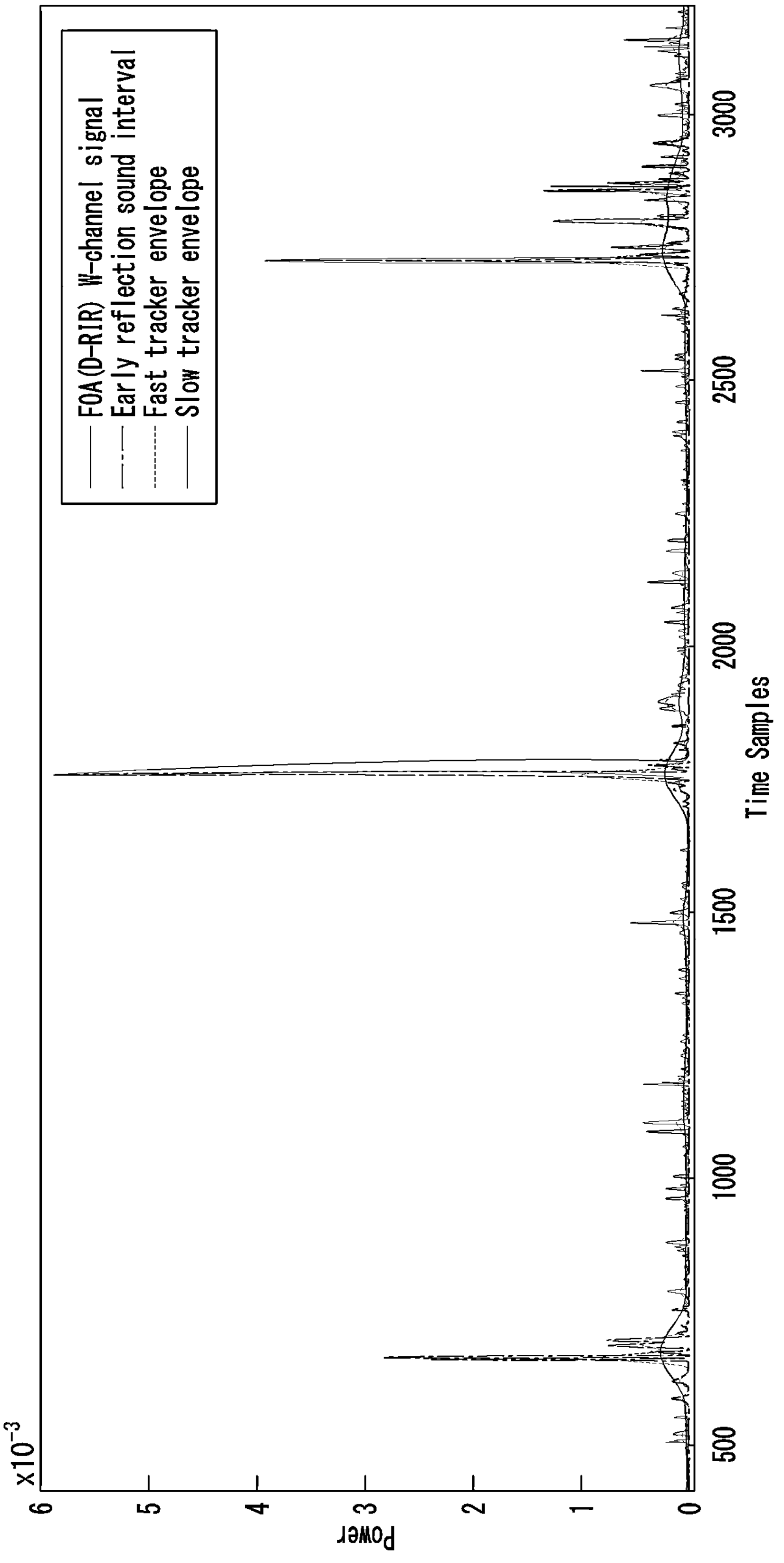
FIG. 7 is a conceptual diagram showing an embodiment of the results of the calculation of specular reflection signal intervals.

FIG. 7 shows an example of the traces and specular reflection signal intervals of the fast tracker and the slow tracker, which are classified as described above.

FIG. 7 is a conceptual diagram showing an embodiment of the results of the calculation of specular reflection signal intervals.

Referring to FIG. 7, there are shown the traces of the fast tracker and the slow tracker and specular reflection signal intervals separated by the traces in the partial interval of the W channel signal of an original D-RIR, i.e., an FOA signal.

The specular reflection signal interval separated from the W channel signal may be equally applied to X, Y, and Z channels, and the DOA for the k-th frequency band of the i-th specular reflection for the location $x_j$ of a j-th sound source at time (discrete time) n may be calculated as an azimuth angle $\theta_j^i(n, k, x_j)$ and an elevation angle $\phi_j^i(n, k, x_j)$, as shown in Equation 6.

$$\theta_j^i(n,k,x_j) = \tan^{-1}\left(\frac{\text{Re}\{W_j^{i*}(n,k,x_j)\cdot Y_j^i(n,k,x_j)\}}{\text{Re}\{W_j^{i*}(n,k,x_j)\cdot X_j^i(n,k,x_j)\}}\right) \tag{6}$$

$$\phi_j^i(n,k,x_j) = \tan^{-1}\left(\frac{-\text{Re}\{W_j^{i*}(n,k,x_j)\cdot Z_j^i(n,k,x_j)\}}{\sqrt{\text{Re}\{W_j^{i*}(n,k,x_j)\cdot X_j^i(n,k,x_j)\}^2+\text{Re}\{W_j^{i*}(n,k,x_j)\cdot Y_j^i(n,k,x_j)\}^2}}\right)$$

$X_j^i(n, k, x_j)$, $Y_i^j(n, k, x_j)$, and $Z_j^i(n, k, x_j)$ may refer to specular reflection signal intervals separated from X channel, Y channel, and Z channel signals for the k-th frequency band of an i-th specular reflection for the location $x_j$ of a j-th sound source at time (discrete time) n. $Z_j^i(n, k, x_j)$ may refer to a specular reflection signal interval separated from a W channel signal for the k-th frequency band of an i-th specular reflection for the location $x_j$ of a j-th sound source at time (discrete time) n. $W_j^{i*}(n, k, x_j)$ is the result of the conjugate operation of $W_j^i(n, k, x_j)$, and Re{ } may refer to the real part of { }.

The DOA of the i-th specular reflection may be finally calculated by applying a weight based on the energy ratio of each frequency band to the DOA of each frequency band. Equation 7 below shows a method of calculating and applying the weight Weight(n, k, $x_j$) of each frequency band. In this case, DOA calculated for each frequency band may be different. The DOA of the i-th specular reflection may be finally calculated by averaging the DOAs for all time intervals and frequency bands based on weights. In this case, the frequency band to which a weight is applied may be limited according to its energy ratio. The reason for this is that the DOA of a higher energy band is generally more accurate.

$$\text{Weight}(n, k, x_j) = \frac{W_j^i(n, k, x_j) * W_j^{i^*}(n, k, x_j)}{\sum\left(W_j^i(n, k, x_j) * W_j^{i^*}(n, k, x_j)\right)}$$

$$\theta\_w_j^i(n,k,x_j) = \text{Weight}(n,k,x_j) \cdot \theta_j^i(n,k,x_j) \quad \phi\_w_j^i(n,k,x_j) = \text{Weight}(n,k,x_j) \cdot \phi_j^i(n,k,x_j) \tag{7}$$

Weight (n, k, $x_j$) may refer to the weight of the k-th frequency band of an i-th specular reflection for the location $x_j$ of a j-th sound source at time (discrete time) n.

$\theta\_w_j^i(n, k, x_j)$ and $\phi\_w_j^i(n, k, x_j)$ may refer to an azimuth angle and an elevation angle, respectively, compensated by the weight of the k-th frequency band of the i-th specular reflection for the location $x_j$ of the j-th sound source at time (discrete time) n.

A process of selecting some of the measurement points around a real listener location during spatial audio rendering/playback/reproduction according to an embodiment of invention may be determined by taking into the present consideration the location of a listener, the spatial distribution of the measurement points (virtual listener locations), and the relative locational relationship between the measurement points and the location of the listener.

For example, when there is a listener between two D-RIRs as shown in FIG. 4, the two D-RIRs are selected. When there is a listener on a triangular surface formed by three D-RIRs as shown in FIG. 5, the three D-RIRs are selected. In general, in a 3D space, there are many cases where a listener is inside a tetrahedron formed of four D-RIRs as shown in FIG. 6. However, when the insensitivity of human hearing to the elevation direction is taken into consideration, it may also be possible to simplify interpolation to interpolation in a 2D space using three D-RIRs.

To calculate a D-RIR at a listener location, a directional reflection component at the listener location may be generated by interpolating specular reflection signal intervals, directions of arrival, delay times, and attenuation levels at selected measurement points using Equation 2 above. Furthermore, the reverberation and diffusion components are used without change when there are transmitted signals, and artificial reverberation is generated and used based on parameters such as RT60 and an envelope slope, thereby generating a D-RIR at the listener location. In this case, in order to generate reverberation and diffusion components in various directions surrounding the listener, there may be additionally used a method of generating a plurality of reverberation signals by decorrelation and then rendering them in respective directions.

Figure 8:
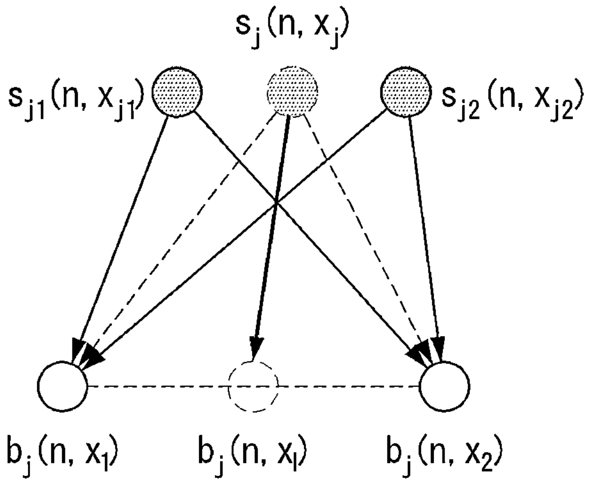
FIG. 8 is a conceptual diagram showing a method of generating a D-RIR for a sound source generated or moved in a rendering/playback/reproducing step.

FIG. 8 is a conceptual diagram showing a method of generating a D-RIR for a sound source generated or moved in a rendering/playback/reproducing step.

In some cases, there may be cases in which a sound source generated or created in the rendering step of a listener terminal after an encoding step needs to be rendered at an arbitrary location in space. To this end, there may be used a method of using a D-RIR for a sound source in a similar location by utilizing the location information of transmitted sound sources or repeatedly performing interpolation on D-RIRs in a specific measurement point for multiple sound sources.

The same method may be used for a sound source that has moved to a location, different from the location of a sound source in an encoding step, at the rendering time of the listener terminal.

According to FIG. 8, D-RIRs $b_j(n,x_1)$ and b $(n,x_2)$ at the measurement points of locations $x_1$ and $x_2$ for the location $s_j$ of a new sound source are generated through interpolation using D-RIRs at the measurement points of locations $x_1$ and $x_2$ for existing sound sources $s_{j1}$ and $s_{j2}$, and then a D-RIR at a current listener location for the location of the new sound source may be generated by the interpolation of $b_j(n,x_1)$ and $b_j(n,x_2)$. Although interpolation on a one-dimensional straight line using two sound sources and measurement points as shown in FIG. 4 is assumed for convenience of description in FIG. 8, interpolation on a 2D plane as shown in FIG. 5 or interpolation in a 3D space as shown in FIG. 6 may be described based on the same concept.

Referring to FIGS. 1 to 8, an embodiment of the present invention may propose a process for spatial audio rendering/playback/reproduction through the interpolation of previously measured multiply D-RIRs distributed in a given space in a 6DoF virtual reality or augmented reality environment.

An embodiment of the present invention may include a process of generating a D-RIR at a listener location through the interpolation of two or more transmitted D-RIRs by extracting the DOAs, delays, and attenuation levels of reflections from previously measured multiple D-RIRs and comparing them.

An embodiment of the present invention may include a process of detecting the interval of a reflection component and calculating the DOA of the reflection when previously measured multiple D-RIRs are signals actually recorded by ambisonic microphones.

Figure 9:
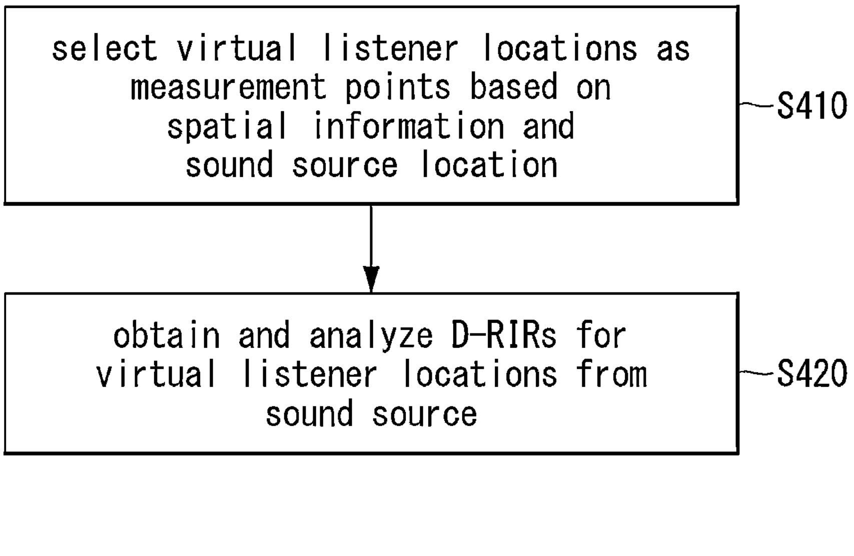
FIG. 9 is an operational flowchart showing a method for spatial audio encoding through the interpolation of multiple D-RIRs according to an embodiment of the present invention.

FIG. 9 is an operational flowchart showing a method for spatial audio encoding through the interpolation of multiple D-RIRs according to an embodiment of the present invention.

A method for spatial audio encoding based on D-RIRs according to an embodiment of the present invention is a method that is performed by a processor that executes one or more instructions stored in memory. The method for spatial audio encoding includes: step S410 of selecting virtual listener locations as measurement points based on spatial information and at least one sound source location; and step S420 of obtaining D-RIRs for the virtual listener locations from the at least one sound source. In this case, the D-RIRs for the virtual listener locations from the at least one sound source may include responses to sound arriving directly at the virtual listener locations from the at least one sound source, and responses to sound reflected within a given space and arriving at the virtual listener locations, based on information about the given space in a 6DoF virtual reality environment.

Figure 10:
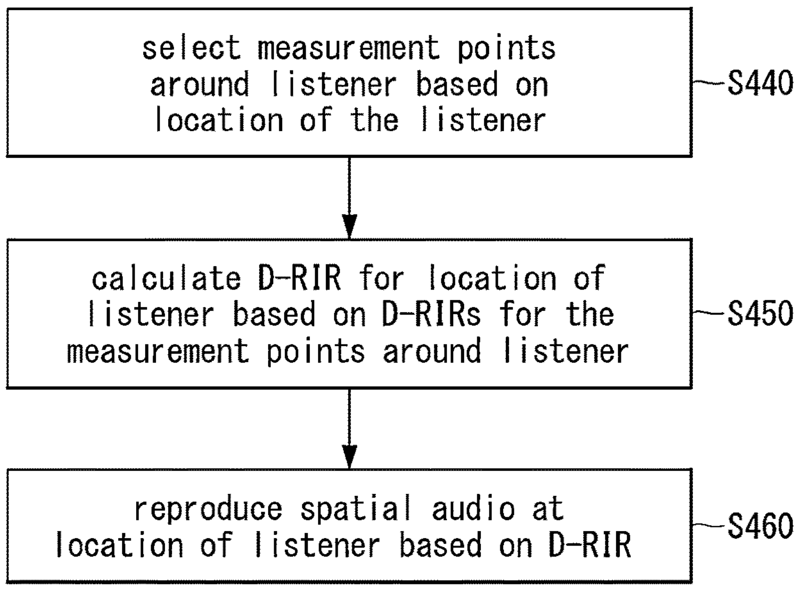
FIG. 10 is an operational flowchart showing a method for spatial sound rendering/reproduction using multiple D-RIR interpolation according to an embodiment of the present invention.

FIG. 10 is an operational flowchart showing a method for spatial sound rendering/reproduction using multiple D-RIR interpolation according to an embodiment of the present invention.

A method for spatial audio reproduction based on D-RIRs according to an embodiment of the present invention is a method that is performed by a processor that executes one or more instructions stored in memory. The method for spatial audio reproduction includes: step S440 of selecting measurement points around a listener based on the location of the listener; step S450 of calculating a D-RIR for the location of the listener based on D-RIRs for the measurement points around the listener; and step S460 of reproducing spatial audio at the location of the listener based on the D-RIR at the location of the listener.

In step S450 of calculating the D-RIR for the location of the listener, the D-RIR for the location of the listener may be calculated by interpolating the D-RIRs for the plurality of measurement points around the listener for the location of the listener.

Step S450 of calculating the D-RIR for the location of the listener may include the steps of: extracting the attenuation level, delay, and direction of arrival of reflection from each of the multiple D-RIRs previously measured for the plurality of measurement points around the listener; and calculating the D-RIR for the location of the listener by interpolating the D-RIR information, extracted from the multiple D-RIRs previously measured for the plurality of measurement points around the listener, for the location of the listener.

Step S450 of calculating the D-RIR for the location of the listener may include the steps of: obtaining D-RIRs arriving at the measurement points around the listener from at least one sound source; interpolating the D-RIRs, arriving at the measurement points around the listener from the at least one sound source, for the location of the listener; and obtaining a D-RIR arriving at the location of the listener from the at least one sound source based on the results of the interpolation.

The D-RIRs for the plurality of measurement points around the listener may be signals obtained using ambisonic microphones. The step of obtaining the D-RIRs arriving at the measurement points around the listener from the at least one sound source may include the step of detecting the intervals of reflection components based on modeling using ambisonic microphones and calculating the directions of arrival of the reflections.

Step S450 of calculating the D-RIR for the location of the listener may include the steps of: obtaining D-RIRs arriving at the measurement points around the listener from the at least one first sound source; performing first interpolation on the D-RIRs, arriving at the measurement points around the listener from the at least one first sound source, for the location of a new second sound source; performing second interpolation on D-RIRs, arriving at the measurement points around the listener from the second sound source obtained as a result of the first interpolation, for the location of the listener; and obtaining a D-RIR, arriving at the location of the listener from the second sound source, based on the results of the second interpolation.

In step S440 of selecting the measurement points around the listener based on the location of the listener, two or more measurement points around the listener may be selected from among a plurality of virtual listener measurement points each having a D-RIR arriving from at least one sound source based on the relative locations of the plurality of virtual listener measurement points and the location of the listener.

In step S440 of selecting the measurement points around the listener based on the location of the listener, the measurement points around the listener may be selected from among a plurality of virtual listener measurement points that are distributed in a given space in a virtual reality environment having 6DoF and each of the plurality of virtual listener measurement points have a D-RIR.

In step S450 of calculating the D-RIR for the location of the listener, the D-RIR for the location of the listener may be calculated using the D-RIRs previously obtained for the measurement points around the listener in a given space in a virtual reality environment having 6DoF.

Figure 11:
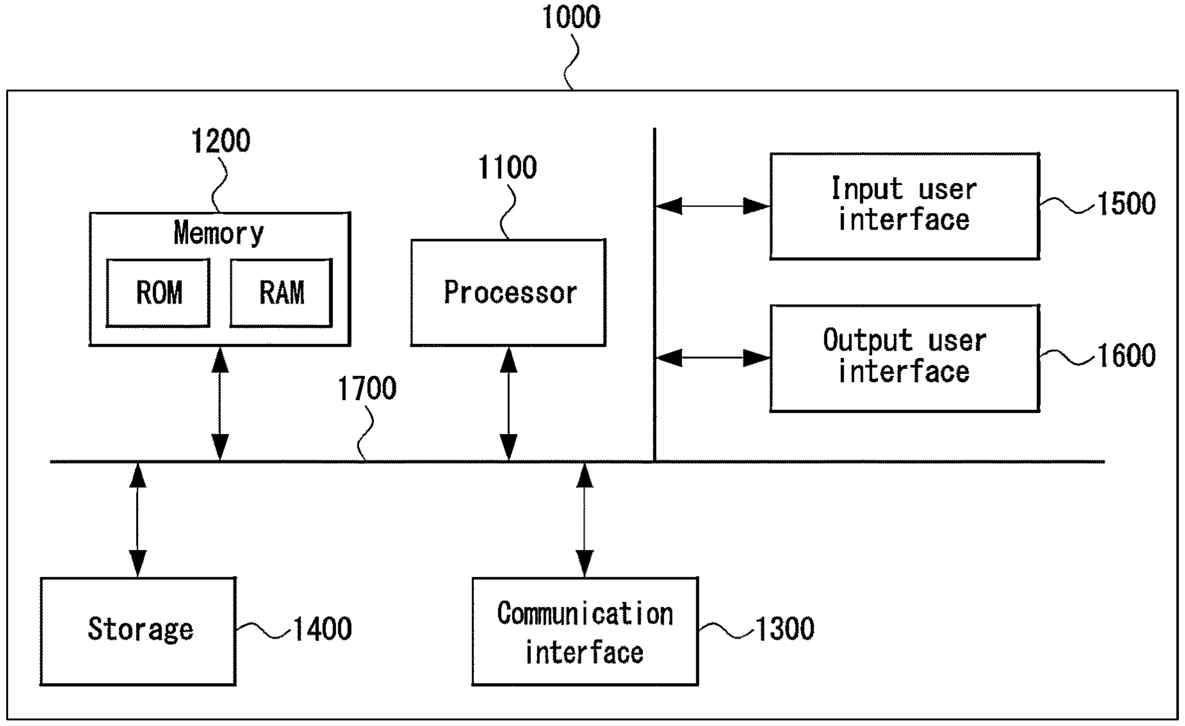
FIG. 11 is a conceptual diagram showing an example of an apparatus for spatial audio encoding, apparatus for spatial audio reproduction, or computing system using generalized D-RIR interpolation capable of performing at least part of the processes of FIGS. 1 to 10.

FIG. 11 is a conceptual diagram showing an example of an apparatus for spatial audio encoding, apparatus for spatial audio reproduction, or computing system using generalized D-RIR interpolation capable of performing at least part of the processes of FIGS. 1 to 10.

At least a part of process of the D-RIR interpolation-based spatial sound reproducing/rendering/reproducing method or encoding method according to an embodiment of the present invention may be executed by the computing system 1000 of FIG. 11.

As shown in FIG. 11, the computing system 1000 according to an exemplary embodiment of the present disclosure may be configured to include a processor 1100, a memory 1200, a communication interface 1300, a storage device 1400, an input user interface 1500, an output user interface 1600, and a bus 1700.

The computing system 1000 according to an exemplary embodiment of the present disclosure may include the at least one processor 1100 and the memory 1200 storing instructions instructing the at least one processor 1100 to perform at least one step. At least some steps of the method according to exemplary embodiments of the present disclosure may be performed by the at least one processor 1100 loading the instructions from the memory 1200 and executing them.

The processor 1100 may mean a central processing unit (CPU), a graphics processing unit (GPU), or a dedicated processor on which the methods according to exemplary embodiments of the present disclosure are performed.

Each of the memory 1200 and the storage device 1400 may include at least one of a volatile storage medium and a non-volatile storage medium. For example, the memory 1200 may include at least one of a read only memory (ROM) and a random access memory (RAM).

In addition, the computing system 1000 may include the communication interface 1300 that performs communication through a wireless network.

In addition, the respective components included in the computing system 1000 may be connected by the bus 1700 to communicate with each other.

For example, the computing system 1000 of the present disclosure may be a desktop computer, a laptop computer, a notebook, a smart phone, a tablet PC, a mobile phone, a smart watch, a smart glass, e-book reader, a portable multimedia player (PMP), a portable gaming device, a navigation device, a digital camera, a digital multimedia broadcasting (DMB) player, a digital audio recorder, a digital audio player, a digital video recorder, a digital video player, a personal digital assistant (PDA), and the like having communication capability.

An apparatus for spatial audio reproduction based on D-RIRs according to an embodiment of the present invention memory 1200 configured to store at least one includes: instruction; and a processor 1100 configured to execute the at least one instruction. The processor 1100 executes at least one instruction to select measurement points around a listener based on the location of the listener, to calculate a D-RIR for the location of the listener based on D-RIRs for the measurement points around the listener, and to reproduce spatial audio at the location of the listener based on the D-RIR for the location of the listener.

The processor 1100 may execute the at least one instruction to calculate the D-RIR for the location of the listener by interpolating the D-RIRs for the plurality of measurement points around the listener for the location of the listener.

The processor 1100 may execute the at least one instruction to extract the attenuation level, delay, direction of arrival a reflection from each of the multiple D-RIRs previously measured for the plurality of measurement points around the listener, and to calculate the D-RIR for the location of the listener by interpolating the D-RIR information, extracted from the multiple D-RIRs previously measured for the plurality of measurement points around the listener, for the location of the listener.

The processor 1100 may execute the at least one instruction to obtain D-RIRs arriving at the measurement points around the listener from at least one sound source, to interpolate the D-RIRs, arriving at the measurement points around the listener from the at least one sound source, for the location of the listener, and to obtain a D-RIR arriving at the location of the listener from the at least one sound source based on the results of the interpolation.

The D-RIRs for the plurality of measurement points around the listener may be signals obtained using ambisonic microphones. The processor 1100 may execute the at least one instruction to obtain the D-RIRs arriving at the measurement points around the listener from the at least one sound source by detecting the intervals of reflection components based on modeling using ambisonic microphones and calculating the directions of arrival of the reflections.

The processor 1100 may execute the at least one instruction to obtain D-RIRs arriving at the measurement points around the listener from the at least one first sound source, to perform first interpolation on the D-RIRs, arriving at the measurement points around the listener from the at least one first sound source, for the location of a new second sound source, to perform second interpolation on D-RIRs, arriving at the measurement points around the listener from the second sound source obtained as a result of the first interpolation, for the location of the listener, and to obtain a D-RIR, arriving at the location of the listener from the second sound source, based on the results of the second interpolation.

The processor 1100 may execute the at least one instruction to select two or more measurement points around the listener from among a plurality of virtual listener measurement points each having a D-RIR arriving from at least one sound source based on the relative locations of the plurality of virtual listener measurement points and the location of the listener.

The processor 1100 may execute the at least one instruction to select the measurement points around the listener from among a plurality of virtual listener measurement points that are distributed in a given space in a virtual reality environment having 6DoF and each of the plurality of virtual listener measurement points have a D-RIR.

The processor 1100 may execute the at least one instruction to calculate the D-RIR for the location of the listener using the D-RIRs previously obtained for the measurement points around the listener in a given space in a virtual reality environment having 6DoF.

The processor 1100 may execute the at least one instruction to select virtual listener locations as measurement points based on spatial information and at least one sound source location, and to obtain D-RIRs for the virtual listener locations from the at least one sound source. In this case, the D-RIRs for the virtual listener locations from the at least one sound source may include responses to sound arriving directly at the virtual listener locations from the at least one sound source and responses to sound reflected within a given space and arriving at the virtual listener locations, based on information about the given space in a 6DoF virtual reality environment.

According to an embodiment of the present invention, spatial audio may be efficiently encoded using multiple D-RIRs previously generated through spatial audio analysis in a virtual reality or augmented reality content production step.

According to an embodiment of the present invention, a D-RIR corresponding to the location of a user can be effectively generated by the interpolation of encoded multiple D-RIRs, so that high-quality 6DoF spatial audio can be provided using a relatively simple process rather than a complicated process of modeling spatial audio during rendering.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for spatial audio reproduction based on directional room impulse responses, the method being performed by a processor that executes at least one instruction stored in memory, the method comprising:

selecting measurement points around a listener based on a location of the listener;

calculating a directional room impulse response (D-RIR) for the location of the listener based on directional room impulse responses (D-RIRs) for the measurement points around the listener; and reproducing spatial audio at the location of the listener based on the D-RIR at the location of the listener.

2. The method of claim 1, wherein the calculating comprises calculating the D-RIR for the location of the listener by interpolating the D-RIRs for the plurality of measurement points around the listener for the location of the listener.

3. The method of claim 2, wherein the calculating comprises:

extracting an attenuation level, a delay, and a direction of arrival of reflection from each of the multiple D-RIRs previously measured for the plurality of measurement points around the listener; and calculating the D-RIR for the location of the listener by interpolating the D-RIR information, extracted from the multiple D-RIRs previously measured for the plurality of measurement points around the listener, for the location of the listener.

4. The method of claim 1, wherein the calculating comprises:

obtaining D-RIRs arriving at the measurement points around the listener from at least one sound source;

interpolating the D-RIRs, arriving at the measurement points around the listener from the at least one sound source, for the location of the listener; and obtaining a D-RIR arriving at the location of the listener from the at least one sound source based on results of the interpolation.

5. The method of claim 4, wherein:

the D-RIRs for the plurality of measurement points around the listener are signals obtained using ambisonic microphones; and obtaining the D-RIRs arriving at the measurement points comprises:

detecting intervals of reflection components based on modeling using ambisonic microphones; and calculating directions of arrival of reflections.

6. The method of claim 1, wherein the calculating the D-RIR for the location of the listener comprises:

obtaining D-RIRs arriving at the measurement points around the listener from the at least one first sound source;

performing first interpolation on the D-RIRs, arriving at the measurement points around the listener from the at least one first sound source, for a location of a new second sound source;

performing second interpolation on D-RIRs, arriving at the measurement points around the listener from the second sound source obtained as a result of the first interpolation, for the location of the listener; and obtaining a D-RIR, arriving at the location of the listener from the second sound source, based on results of the second interpolation.

7. The method of claim 1, wherein the selecting comprises selecting two or more measurement points around the listener from among a plurality of virtual listener measurement points each having a D-RIR arriving from at least one sound source based on relative locations of the plurality of virtual listener measurement points and the location of the listener.

8. The method of claim 1, wherein the selecting comprises selecting the measurement points around the listener from among a plurality of virtual listener measurement points that are distributed in a given space in a virtual reality environment having six degrees of freedom (6DoF) and each of the plurality of virtual listener measurement points have a D-RIR.

9. The method of claim 1, wherein the calculating comprises calculating the D-RIR for the location of the listener using the D-RIRs previously obtained for the measurement points around the listener in a given space in a virtual reality environment having 6DoF.

10. A method for spatial audio reproduction based on directional room impulse responses, the method being performed by a processor that executes at least one instruction stored in memory, the method comprising:

selecting virtual listener locations as measurement points based on spatial information and at least one sound source location; and obtaining directional room impulse responses (D-RIRs) for the virtual listener locations from the at least one sound source;

wherein the D-RIRs for the virtual listener locations from the at least one sound source comprise responses to sound arriving directly at the virtual listener locations from the at least one sound source, and responses to sound reflected within a given space and arriving at the virtual listener locations, based on information about the given space in a six degrees of freedom (6DoF) virtual reality environment.

11. An apparatus for spatial audio reproduction based on directional room impulse responses, the apparatus comprising:

memory configured to store at least one instruction; and a processor configured to execute the at least one instruction;

wherein the processor is further configured to execute the at least one instruction to:

select measurement points around a listener based on the location of the listener;

calculate a directional room impulse response (D-RIR) for the location of the listener based on directional room impulse responses (D-RIRs) for the measurement points around the listener; and reproduce spatial audio at the location of the listener based on the D-RIR for the location of the listener.

12. The apparatus of claim 11, wherein the processor is further configured to execute the at least one instruction to calculate the D-RIR for the location of the listener by interpolating the D-RIRs for the plurality of measurement points around the listener for the location of the listener.

13. The apparatus of claim 12, wherein the processor is further configured to execute the at least one instruction to:

extract an attenuation level, a delay, and a direction of arrival of reflection from each of the multiple D-RIRs previously measured for the plurality of measurement points around the listener; and calculate the D-RIR for the location of the listener by interpolating the D-RIR information, extracted from the multiple D-RIRs previously measured for the plurality of measurement points around the listener, for the location of the listener.

14. The apparatus of claim 11, wherein the processor is further configured to execute the at least one instruction to:

obtain D-RIRs arriving at the measurement points around the listener from at least one sound source;

interpolate the D-RIRs, arriving at the measurement points around the listener from the at least one sound source, for the location of the listener; and obtain a D-RIR arriving at the location of the listener from the at least one sound source based on results of the interpolation.

15. The apparatus of claim 11, wherein:

the D-RIRs for the plurality of measurement points around the listener are signals obtained using ambisonic microphones; and the processor is further configured to execute the at least one instruction to obtain the D-RIRs arriving at the measurement points by detecting intervals of reflection components based on modeling using ambisonic microphones and calculating directions of arrival of reflections.

16. The apparatus of claim 11, wherein the processor is further configured to execute the at least one instruction to:

obtain D-RIRs arriving at the measurement points around the listener from the at least one first sound source;

perform first interpolation on the D-RIRs, arriving at the measurement points around the listener from the at least one first sound source, for a location of a new second sound source;

perform second interpolation on D-RIRs, arriving at the measurement points around the listener from the second sound source obtained as a result of the first interpolation, for the location of the listener; and obtain a D-RIR, arriving at the location of the listener from the second sound source, based on results of the second interpolation.

17. The apparatus of claim 11, wherein the processor is further configured to execute the at least one instruction to select two or more measurement points around the listener from among a plurality of virtual listener measurement points each having a D-RIR arriving from at least one sound source based on relative locations the plurality of virtual listener measurement points and the location of the listener.

18. The apparatus of claim 11, wherein the processor is further configured to execute the at least one instruction to select the measurement points around the listener from among a listener measurement points that are plurality of virtual distributed in a given space in a virtual reality environment having six degrees of freedom (6DoF) and each of the plurality of virtual listener measurement points have a D-RIR.

19. The apparatus of claim 11, wherein the processor is further configured to execute the at least one instruction to calculate the D-RIR for the location of the listener using the D-RIRs previously obtained for the measurement points around the listener in a given space in a virtual reality environment having 6DoF.

20. The apparatus of claim 11, wherein:

the processor is further configured to execute the at least one instruction to:

select virtual listener locations as measurement points based on spatial information and at least one sound source location; and obtain D-RIRs for the virtual listener locations from the at least one sound source; and wherein the D-RIRs for the virtual listener locations from the at least one sound source comprise responses to sound arriving directly at the virtual listener locations from the at least one sound source, and responses to sound reflected within a given space and arriving at the virtual listener locations, based on information about the given space in a six degrees of freedom (6DoF) virtual reality environment.

* * * * *